(12) United States Patent
Tao et al.

(10) Patent No.: US 12,386,627 B2
(45) Date of Patent: Aug. 12, 2025

(54) COMPUTING APPARATUS, INTEGRATED CIRCUIT CHIP, BOARD CARD, ELECTRONIC DEVICE, AND COMPUTING METHOD

(71) Applicant: CAMBRICON (XI'AN) SEMICONDUCTOR CO., LTD., Shaanxi (CN)

(72) Inventors: Jinhua Tao, Shaanxi (CN); Shaoli Liu, Shaanxi (CN)

(73) Assignee: CAMBRICON (XI'AN) SEMICONDUCTOR CO., LTD., Shaanxi (CN)

( * ) Notice: Subject to any disclaimer, the term of this patent is extended or adjusted under 35 U.S.C. 154(b) by 377 days.

(21) Appl. No.: 18/013,807

(22) PCT Filed: May 25, 2021

(86) PCT No.: PCT/CN2021/095699
§ 371 (c)(1),
(2) Date: Dec. 29, 2022

(87) PCT Pub. No.: WO2022/001496
PCT Pub. Date: Jan. 6, 2022

(65) Prior Publication Data
US 2023/0297386 A1 Sep. 21, 2023

(30) Foreign Application Priority Data
Jun. 30, 2020 (CN) .......................... 202010618112.9

(51) Int. Cl.
*G06F 9/38* (2018.01)
*G06F 9/30* (2018.01)

(52) U.S. Cl.
CPC ........ *G06F 9/3867* (2013.01); *G06F 9/30025* (2013.01); *G06F 9/30036* (2013.01); *G06F 9/38* (2013.01)

(58) Field of Classification Search
CPC .... G06F 9/30025; G06F 9/30036; G06F 9/38; G06F 9/3867
See application file for complete search history.

(56) References Cited

U.S. PATENT DOCUMENTS

| | | | |
|---|---|---|---|
| 5,590,356 A | 12/1996 | Gilbert | |
| 2011/0016153 A1* | 1/2011 | Atta | G06F 16/24532 707/E17.011 |

(Continued)

FOREIGN PATENT DOCUMENTS

| | | |
|---|---|---|
| CN | 105468335 A | 4/2016 |
| CN | 107729990 A | 2/2018 |

(Continued)

OTHER PUBLICATIONS

International Search Report for PCT/CN2021/095699 mailed on Aug. 24, 2021.

(Continued)

*Primary Examiner* — Zachary K Huson
(74) *Attorney, Agent, or Firm* — The PL Law Group, PLLC

(57) ABSTRACT

A computing apparatus may be included in a combined processing apparatus. The combined processing apparatus may further include a general interconnection interface and other processing apparatus. The computing apparatus interacts with other processing apparatus to jointly complete a computing operation specified by a user. The combined processing apparatus may further include a storage apparatus. The storage apparatus is connected to the apparatus and other processing apparatus, respectively. The storage apparatus is used to store data of the apparatus and other (Continued)

processing apparatus. Efficiency of various operations in data processing fields including, for example, an artificial intelligence field can be improved so that overall overheads and costs of the operations can be reduced.

19 Claims, 7 Drawing Sheets

(56) References Cited

U.S. PATENT DOCUMENTS

| | | | |
|---|---|---|---|
| 2011/0219212 A1* | 9/2011 | Codrescu | G06F 9/30149 |
| | | | 712/E9.016 |
| 2016/0378715 A1 | 12/2016 | Kang et al. | |
| 2018/0063455 A1* | 3/2018 | Wakamiya | H04N 25/673 |
| 2018/0307489 A1 | 10/2018 | Kennedy et al. | |
| 2018/0336456 A1 | 11/2018 | Norrie et al. | |
| 2020/0117614 A1 | 4/2020 | Zhang et al. | |
| 2021/0406649 A1* | 12/2021 | Zhang | G06F 9/30181 |

FOREIGN PATENT DOCUMENTS

| | | |
|---|---|---|
| CN | 109062609 A | 12/2018 |
| CN | 111047005 A | 4/2020 |
| CN | 111047045 A | 4/2020 |
| CN | 111178492 A | 5/2020 |
| CN | 111242321 A | 6/2020 |
| JP | 2001-100997 A | 4/2001 |
| JP | 2006-031329 A | 2/2006 |
| JP | 2006-163757 A | 6/2006 |
| JP | 2017-016637 A | 1/2017 |
| JP | 2020-519981 A | 7/2020 |

OTHER PUBLICATIONS

Office action issued on Jan. 16, 2024 from Japan Intellectual Property Office in a counterpart Japanese Patent Application No. 2022-581721 (all the cited references are listed in this IDS.) (English translation is also submitted herewith.).
Yoshota Takahiko, "D10V media processor for low-power mobile phones", bit, vol. 32 No. 1, vol. 400, Jan. 1, 2000, pp. 19-25 .(English translation of Abstract is included in p. 8.).
Office action issued on Feb. 18, 2025 from China Patent Office in a counterpart China Patent Application No. 202010618112.9 (all the cited references are listed in this IDS.) (English translation is also submitted herewith. See the highlighted sentences of pp. 4-9).
Office action issued on Feb.18, 2025 from Korean Patent Office in a counterpart Korean Patent Application No. 10-2022-7046378 (English translation is also submitted herewith. See the pp. 3-4).
Office action issued on Oct. 8, 2024 from Japan Intellectual Property Office in a counterpart Japanese Patent Application No. 2022-581721 (all the cited references are listed in this IDS.) (English translation is also submitted herewith.).
Office action issued on May 30, 2025 from China Patent Office in a counterpart China Patent Application No. 202010618112.9 (all the cited references are listed in this IDS.) (English translation is also submitted).
Jiang Benshan, "Digital Computer Organization Principles", Beijing Institute of Technology Press, Sep. 30, 1999, p. 195 (English translation is also submitted herewith.).

* cited by examiner

COMPUTING APPARATUS, INTEGRATED CIRCUIT CHIP, BOARD CARD, ELECTRONIC DEVICE, AND COMPUTING METHOD

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/CN2021/095699, filed May 25, 2021, which claims priority to the benefit of Chinese Patent Application No. 202010618112.9 filed in the Chinese Intellectual Property Office on Jun. 30, 2020, the entire contents of which are incorporated herein by reference.

BACKGROUND

1. Technical Field

The present disclosure generally relates to a computing field. More specifically, the present disclosure relates to a computing apparatus, an integrated circuit chip, a board card, an electronic device, and a computing method.

2. Background Art

In a computing system, an instruction set is a set of instructions used to perform computing and control the computing system. Moreover, the instruction set plays a key role in improving performance of a computing chip (such as a processor) in the computing system. At present, various computing chips (especially chips in an artificial intelligence field), by using associated instruction sets, may complete various general or specific control operations and data processing operations. However, there are many defects in the existing instruction set. For example, limited by a hardware architecture, the existing instruction set performs poorly in flexibility. Further, many instructions may only complete a single operation, but performing a plurality of operations generally requires a plurality of instructions, potentially resulting in an increase in throughput of on-chip I/O data. Additionally, there is still improvement room for a current instruction in execution speed, execution efficiency and power consumption on the chip.

SUMMARY

In order to at least solve problems in the prior art, the present disclosure provides a solution of a hardware architecture platform and associated instructions. By using the solution of the present disclosure, flexibility of an instruction may be increased, execution efficiency of the instruction may be improved, and computing costs and overheads may be reduced.

A first aspect of the present disclosure discloses a computing apparatus, including a master processing circuit and at least one slave processing circuit, where the master processing circuit is configured to respond to a master instruction to perform a master operation, and the slave processing circuit is configured to respond to a slave instruction to perform a slave operation, where the master operation includes a pre-processing operation and/or a post-processing operation for the slave operation, and the master instruction and the slave instruction are obtained by parsing a computing instruction received by the computing apparatus.

A second aspect of the present disclosure discloses an integrated circuit chip, including the computing apparatus mentioned in a previous aspect and described in a plurality of embodiments below.

A third aspect of the present disclosure discloses a board card, including the integrated circuit chip mentioned in a previous aspect and described in a plurality of embodiments below.

A fourth aspect of the present disclosure discloses an electronic device, including the integrated circuit chip mentioned in a previous aspect and described in a plurality of embodiments below.

A fifth aspect of the present disclosure discloses a method of using the aforementioned computing apparatus to perform a computing operation, where the computing apparatus includes a master processing circuit and at least one slave processing circuit, and the method includes: configuring the master processing circuit to respond to a master instruction to perform a master operation and configuring the slave processing circuit to respond to a slave instruction to perform a slave operation, where the master operation includes a pre-processing operation and/or a post-processing operation for the slave operation, and the master instruction and the slave instruction are obtained by parsing a computing instruction received by the computing apparatus.

By using the computing apparatus, the integrated circuit chip, the board card, the electronic device, and the method of the present disclosure, the master instruction and the slave instruction associated with the master operation and the slave operation may be performed efficiently, thus speeding up the execution of operations. Further, since the combination of the master operation and the slave operation, the computing apparatus of the present disclosure may support more types of computations and operations. Additionally, according to pipeline operation arrangements based on the computing apparatus of the present disclosure, the computing instruction may be configured flexibly to meet computing requirements.

BRIEF DESCRIPTION OF DRAWINGS

By reading the following detailed description with reference to drawings, the above and other objects, features and technical effects of exemplary implementations of the present disclosure will become easier to understand. In the drawings, several implementations of the present disclosure are shown in an exemplary but not restrictive manner, and the same or corresponding reference numerals indicate the same or corresponding parts.

DETAILED DESCRIPTION

A solution of the present disclosure uses a hardware architecture including a master processing circuit and at least one slave processing circuit to perform an associated data operation. As such, a relatively flexible and simplified computing instruction may be used to complete a relatively complex operation. Specifically, by using a master instruction and a slave instruction that are obtained by parsing a computing instruction, the solution of the present disclosure enables a master processing circuit to perform the master instruction to implement a master operation and enables a slave processing circuit to perform the slave instruction to implement a slave operation, so as to implement various complex operations including, for example, a vector operation. Here, the master operation may include a pre-processing operation and/or a post-processing operation for the slave operation. In an embodiment, the pre-processing operation may be, for example, a data conversion operation and/or a data concatenation operation. In another embodiment, the post-processing operation may be, for example, an arithmetical operation on a slave processing circuit output result. Additionally, according to different operation circuits or operators in the master processing circuit, a computing instruction of the present disclosure may support a flexible and personalized configuration to meet different application scenarios.

The following will describe a technical solution of the present disclosure in detail in combination with drawings.

Figure 1:
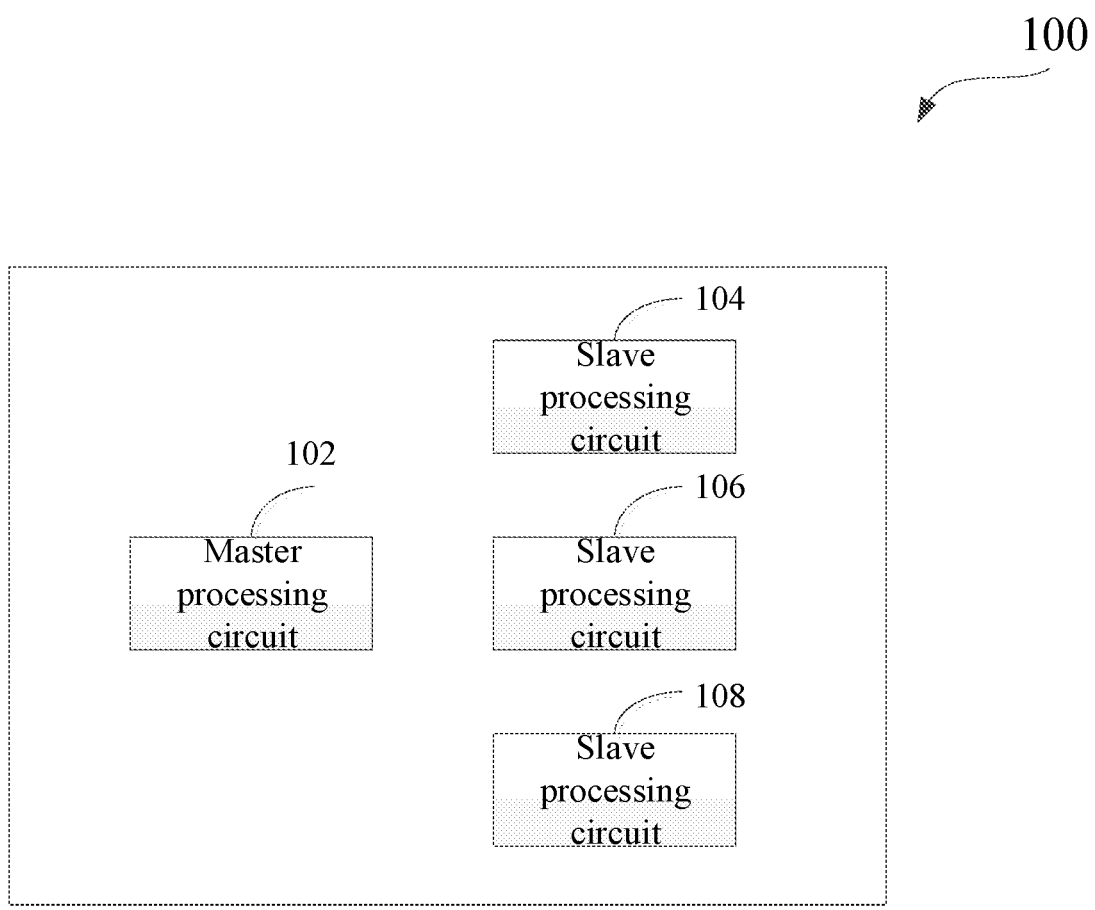
FIG. 1 is an overview diagram of a computing apparatus according to an embodiment of the present disclosure.

FIG. 1 is an overview diagram of a computing apparatus 100 according to an embodiment of the present disclosure. As shown in FIG. 1, the computing apparatus 100 may include a master processing circuit 102 and slave processing circuits, such as slave processing circuits 104, 106 and 108 shown in the figure. Although here shows three slave processing circuits, those skilled in the art may understand that the computing apparatus 100 of the present disclosure may include any suitable number of slave processing circuits, a plurality of slave processing circuits may be connected in different ways, and the plurality of slave processing circuits and the master processing circuit may be connected in different ways, which are not limited by the present disclosure. In one or a plurality of embodiments, the plurality of slave processing circuits of the present disclosure may perform various slave instructions (which are obtained, for example, by parsing a computing instruction) in parallel, so as to improve processing efficiency of the computing apparatus.

In the present disclosure, the computing instruction may be an instruction in an instruction system of an interactive interface of software and hardware. The computing instruction may be a binary or other forms of machine language that are received and processed by hardware such as a processor (or called a processing circuit). The computing instruction may include an operation code used for indicating an operation of the processor, and an operand. According to different application scenarios, the computing instruction may include one or a plurality of operation codes, and when the aforementioned computing instruction includes one operation code, the operation code may be used to indicate a plurality of operations of the processor.

In an embodiment, a master instruction and a slave instruction may be obtained by parsing a computing instruction received by the computing apparatus. In an operation, the master processing circuit may be configured to respond to the master instruction to perform a master operation, and the slave processing circuit may be configured to respond to the slave instruction to perform a slave operation. According to a solution of the present disclosure, the aforementioned master instruction or the aforementioned slave instruction may be a micro-instruction or a control signal operated inside the processor and may include (or may indicate) one or a plurality of operations.

In an embodiment, the aforementioned master operation may include a pre-processing operation and/or a post-processing operation for the slave operation. Specifically, for the master instruction performed by the master processing circuit, the master instruction may include, for example, a pre-processing operation that performs a data conversion and/or data concatenation on to-be-operated data. In some application scenarios, the master instruction may further include a pre-processing operation that only selectively reads data. For example, the master instruction may include reading data that is stored in a dedicated or private caching unit and sending the data to the slave processing circuit, or generating a corresponding random number for an operation of the slave processing circuit. In some other application scenarios, according to the type and number of operators included in the master processing circuit, the master instruction may include one or a plurality of post-processing operations associated with a function of the operator. For example, the master instruction may include a plurality of types of operations including addition, multiplication, lookup table, comparison, averaging, and filtration on intermediate operation results or final operation results that are obtained after the slave processing circuit performs the slave instruction.

For the sake of identifying the pre-processing operation and/or the post-processing operation, in some application scenarios, the master instruction may include an identification bit used for identifying the pre-processing operation and/or the post-processing operation. As such, when acquiring the master instruction, the master processing circuit may determine whether to perform the pre-processing operation or the post-processing operation on operation data according to the identification bit. Additionally or alternatively, the pre-processing operation and the post-processing operation in the master instruction may be distinguished through a preset bit (or called an instruction domain segment) of the computing instruction. For example, when the computing instruction has a preset bit including (master instruction+slave instruction), it may be determined that the master instruction in the computing instruction involves the pre-processing operation for the slave operation. For another example, when the computing instruction has a preset bit including (slave instruction+master instruction), it may be determined that the master instruction in the computing instruction involves the post-processing operation for the slave operation. For the sake of understanding, assuming that the computing instruction has a length of three-segment predetermined bit width (which is the aforementioned preset bit), an instruction located in a first-segment predetermined bit width may be specified as a master instruction used for the pre-processing operation, an instruction of a second-segment predetermined bit width in an intermediate position may be specified as a slave instruction used for the slave operation, and an instruction of a third-segment predetermined bit width in a final position may be specified as a master instruction used for the post-processing operation.

For the slave instruction performed by the slave processing circuit, the slave instruction may include one or a plurality of operations associated with functions of one or a plurality of operation circuits in the slave processing circuit. The slave instruction may include performing an operation on data after the pre-processing operation performed by the master processing circuit. In some application scenarios, the slave instruction may include various operations such as an arithmetic operation, a logical operation, and a data type conversion. For example, the slave instruction may include performing various vector-related multiply accumulate operations including, for example, a convolution operation, on data after the pre-processing operation. In some other application scenarios, when the aforementioned computing instruction does not include the master instruction for the pre-processing operation, the slave processing circuit may perform the slave operation on input data directly according to the slave instruction.

In one or a plurality of embodiments, the master processing circuit 102 may be configured to acquire the computing instruction and parse the computing instruction to obtain the aforementioned master instruction and the aforementioned slave instruction, and send the slave instruction to the slave processing circuit. Specifically, the master processing circuit may include one or a plurality of decoding circuits (or called decoders) used for parsing the computing instruction. Through the internal decoding circuit, the master processing circuit may parse the received computing instruction into one or a plurality of master instructions and/or slave instructions, and the master processing circuit may send the corresponding slave instruction to the slave processing circuit, so that the slave processing circuit performs the slave operation. Here, according to different application scenarios, the slave instruction may be sent to the slave processing circuit in different ways. For example, when the computing apparatus includes a storage circuit, the master processing circuit may send the slave instruction to the storage circuit, and the slave instruction may be sent to the slave processing circuit by the storage circuit. For another example, when the plurality of slave processing circuits perform parallel operations, the master processing circuit may broadcast the same slave instruction to the plurality of slave processing circuits. Additionally or optionally, in some hardware architecture scenarios, the computing apparatus may further include a separate circuit, unit, or module dedicated to parsing the computing instruction received by the computing apparatus, such as an architecture described later in combination with FIG. 2.

In one or a plurality of embodiments, the slave processing circuit of the present disclosure may include a plurality of operation circuits used for performing the slave operation, where the plurality of operation circuits may be connected and configured to perform operations of multi-stage pipelines. According to different operation scenarios, the operation circuits may include one or more of a multiplication circuit, a comparison circuit, an accumulation circuit, and a data conversion circuit that are used for at least performing a vector operation. In an embodiment, when the computing apparatus of the present disclosure is applied to computing in an artificial intelligence field, the slave processing circuit may perform a multi-dimensional convolution operation in a neural network according to the slave instruction.

The above has described the computing apparatus of the present disclosure in combination with FIG. 1. By using the computing apparatus, the master instruction, and the slave instruction of the present disclosure, one computing instruction may be used to complete a plurality of operations. As such, data moving required by each instruction that is caused by the completion of the plurality of operations requiring a plurality of instructions may be reduced, a bottleneck problem of I/O of the computing apparatus may be solved, computing efficiency may be improved effectively, and computing overheads may be decreased effectively. Additionally, a solution of the present disclosure may further set the type and number of operations included in the computing instruction flexibly according to types of operators configured for the master processing circuit and functions of operation circuits configured for the slave processing circuit and through the cooperation of the master processing circuit and the slave processing circuit, so that the computing apparatus may perform a plurality of types of computing operations, thus expanding and enriching application scenarios of the computing apparatus to meet different computing requirements. Additionally, since the master processing circuit and the slave processing circuit may be configured to support the multi-stage pipeline operation, execution efficiency of the operators in the master processing circuit and the slave processing circuit may be improved, thus reducing computing time. According to the description above, those skilled in the art may understand that the hardware architecture shown in FIG. 1 is only exemplary rather than restrictive. According to the present disclosure and under the teaching of the present disclosure, those skilled in the art may also add a new circuit or component based on this architecture, so as to implement more functions or operations. For example, a storage circuit may be added to the architecture shown in FIG. 1, so as to store various instructions and data. Further, the master processing circuit and the slave processing circuit may also be placed in different physical or logical positions and connected through various data interfaces or interconnection units, so as to complete the master operation and the slave operation above through interactions between the master processing circuit and the slave processing circuit.

Figure 2:
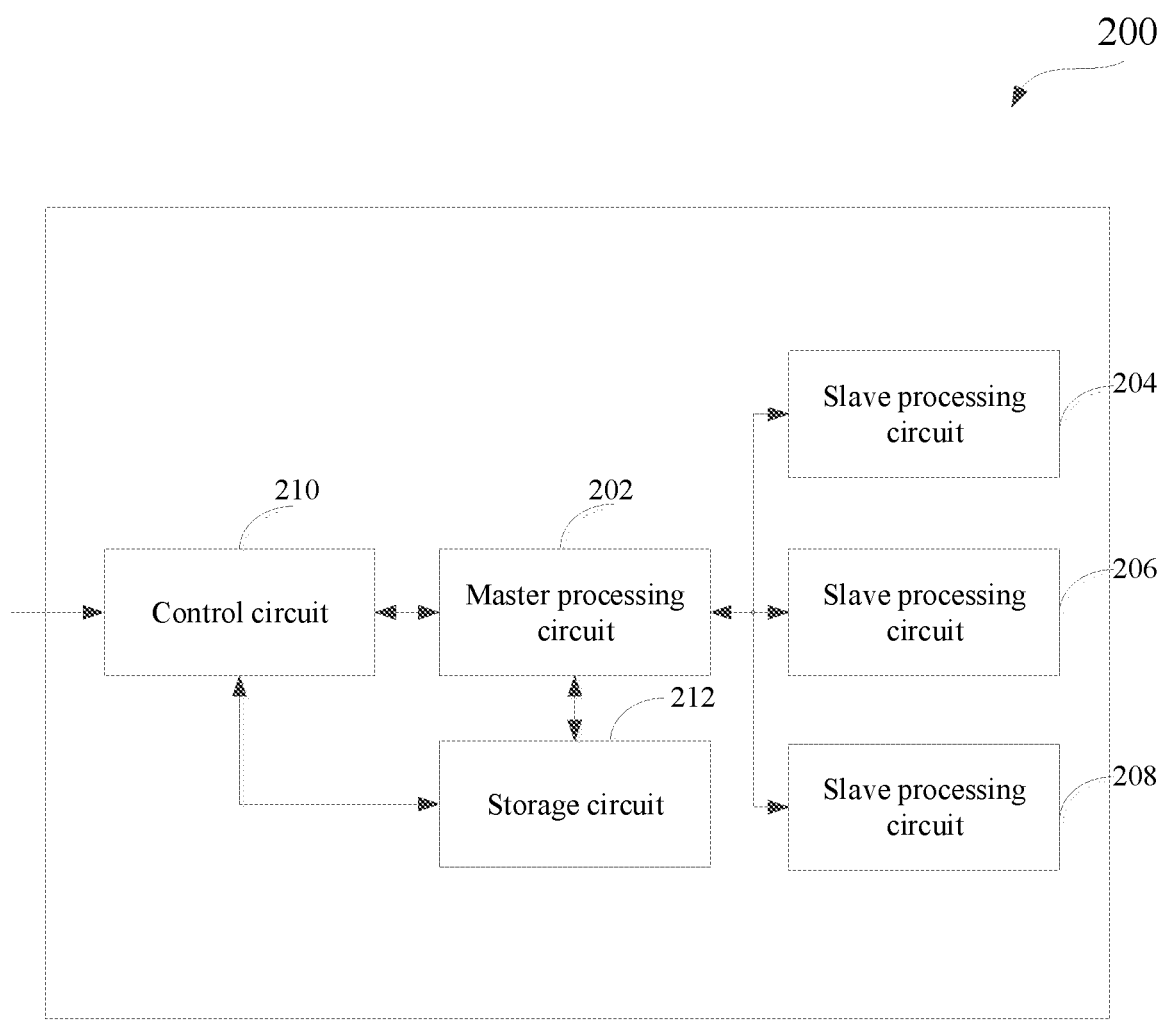
FIG. 2 is a block diagram of a computing apparatus according to an embodiment of the present disclosure.

FIG. 2 is a block diagram of a computing apparatus 200 according to an embodiment of the present disclosure. It may be understood that the computing apparatus 200 shown in FIG. 2 is a specific implementation of the computing apparatus 100 shown in FIG. 1, and therefore, details about the master processing circuit and the slave processing circuit of the computing apparatus 100 described in combination with FIG. 1 are also applicable to the computing apparatus 200 shown in FIG. 2.

As shown in FIG. 2, the computing apparatus 200 of the present disclosure may include a master processing circuit 202 and a plurality of slave processing circuits 204, 206 and 208. Since the above has detailed operations of the master processing circuit and the slave processing circuit in combination with FIG. 1, the following will not describe again. In addition to including the same master processing circuit and slave processing circuit as the computing apparatus 100 shown in FIG. 1, the computing apparatus 200 in FIG. 2 may further include a control circuit 210 and a storage circuit 212. In an embodiment, the control circuit may be configured to acquire a computing instruction and parse the computing instruction to obtain a master instruction and a slave instruction, and send the master instruction to the master processing circuit 202 and send the slave instruction to one or more of the plurality of slave processing circuits 204, 206 and 208. In a scenario, the control circuit may send the slave instruction obtained after parsing to the slave processing circuit through the master processing circuit, as shown in FIG. 2. Alternatively, when there is a connection between the control circuit and the slave processing circuit, the control circuit may also send the parsed slave instruction to the slave processing circuit directly. Similarly, when there is a connection between the storage circuit and the slave processing circuit, the control circuit may also send the slave instruction to the slave processing circuit via the storage circuit.

In one or a plurality of embodiments, the storage circuit 212 may store various computing-related data or instructions. For example, the storage circuit may store neural-network-operation-related neuron or weight data, or the storage circuit may store a final operation result obtained after the post-processing operation performed by the master processing circuit. For another example, the storage circuit may store an intermediate result obtained after the pre-processing operation performed by the master processing circuit, or the storage circuit may store an intermediate result obtained after the operation performed by the slave processing circuit. In some application scenarios, the storage circuit may serve as an on-chip memory of the computing apparatus 200 to perform data read and write operations with an off-chip memory, for example, through a direct memory access (DMA) interface. In some scenarios, when the computing instruction is parsed by the control circuit, the storage circuit may store operation instructions obtained after parsing by the control circuit, such as the master instruction and/or the slave instruction. Additionally, although the storage circuit is represented by a block in FIG. 2, according to different application scenarios, the storage circuit may be implemented as a memory including a master memory and a master caching unit. The master memory may be used to store related operation data such as a neuron, a weight, and various constant terms. The master caching unit may be used to store intermediate data temporarily, such as data after the pre-processing operation and data before the post-processing operation, and these pieces of intermediate data may be invisible to an operator according to settings.

In an interactive application of the master memory and the master processing circuit, a pipeline operation circuit of the master processing circuit may also perform a corresponding operation by using a mask stored in a master storage circuit. For example, during an execution process of the pipeline operation, the operation circuit may read a mask from the master storage circuit, and the operation circuit may use the mask to represent whether data used for performing the operation in the operation circuit is valid. The master storage circuit may not only perform internal storage applications, but also perform data interaction with a storage apparatus outside the computing apparatus of the present disclosure. For example, the master storage circuit may perform data exchange with an external storage apparatus through the DMA.

Figure 3:
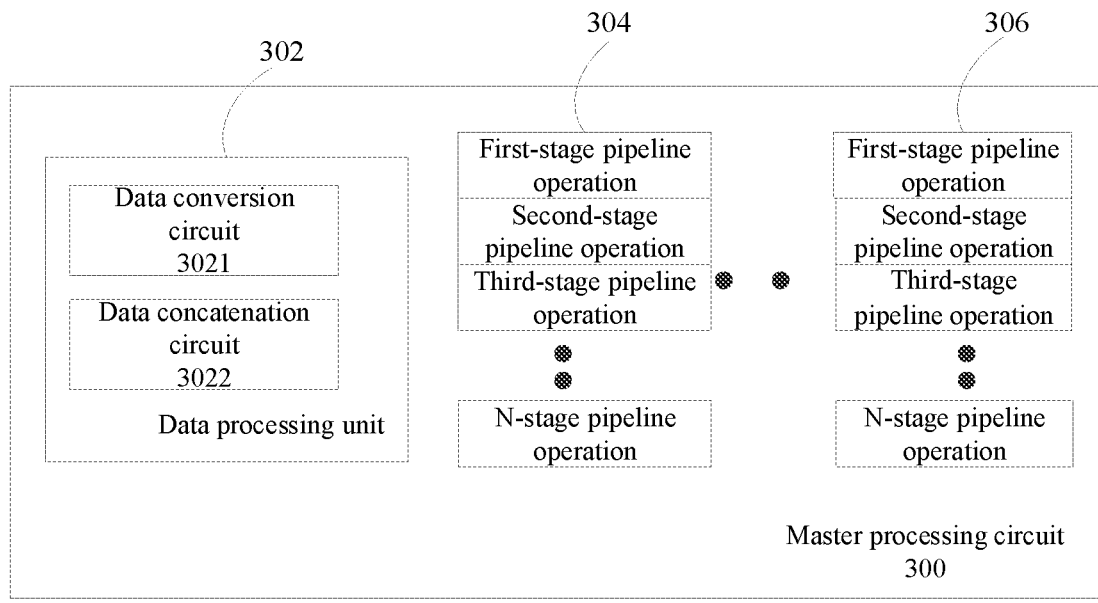
FIG. 3 is a block diagram of a master processing circuit of a computing apparatus according to an embodiment of the present disclosure.

FIG. 3 is a block diagram of a master processing circuit 300 of a computing apparatus according to an embodiment of the present disclosure. It may be understood that the master processing circuit 300 shown in FIG. 3 is the master processing circuit shown and described in combination with FIG. 1 and FIG. 2. Therefore, descriptions of the master processing circuit in FIG. 1 and FIG. 2 are applicable to the following description in combination with FIG. 3.

As shown in FIG. 3, the master processing circuit 300 may include a data processing unit 302, a first-group pipeline operation circuit 304, a last-group pipeline operation circuit 306, and one or a plurality of groups of pipeline operation circuits (which are replaced by black circles) between the first-group pipeline operation circuit 304 and the last-group pipeline operation circuit 306. In an embodiment, the data processing unit 302 includes a data conversion circuit 3021 and a data concatenation circuit 3022. As described earlier, when a master operation includes a pre-processing operation for a slave operation, such as a data conversion operation or a data concatenation operation, the data conversion circuit 3021 or the data concatenation circuit 3022 may perform a corresponding conversion operation or concatenation operation according to a corresponding master instruction. The following will explain the conversion operation and the concatenation operation with examples.

For the data conversion operation, when a bit width of data that is input to the data conversion circuit is relatively large (for example, the bit width of the data is 1024 bits), the data conversion circuit may convert the input data into data with a relatively small bit width (for example, a bit width of output data is 512 bits) according to operation requirements. According to different application scenarios, the data conversion circuit may support conversions among a plurality of data types. For example, the data conversion circuit may perform conversions among data types with different bit widths such as FP16 (floating-point number 16 bits), FP32 (floating-point number 32 bits), FIX8 (fixed-point number 8 bits), FIX4 (fixed-point number 4 bits), and FIX16 (fixed-point number 16 bits), and the like. When data that is input to the data conversion circuit is a matrix, the data conversion operation may be a transformation of positions of matrix elements. The transformation may include, for example, matrix transposing and mirroring (which will be described later in combination with FIGS. 4A-4C), matrix rotations based on predetermined angles (such as 90 degrees, 180 degrees, or 270 degrees), and conversions of matrix dimensions.

For the data concatenation operation, the data concatenation circuit may perform parity concatenation on data blocks extracted from the data according to, for example, a bit length set in the instruction. For example, if the bit length of the data is 32 bits, the data concatenation circuit may divide the data into eight data blocks numbered 1-8 according to a bit length of 4 bits, and then concatenate four data blocks numbered 1, 3, 5 and 7 together and concatenate four data blocks numbered 2, 4, 6 and 8 together for the operation.

In some other application scenarios, the aforementioned data concatenation operation may be performed on data M (such as a vector) obtained after the operation. Assuming that the data concatenation circuit may split low 256 bits of even-numbered rows of the data M in units of 8 bits to obtain 32 pieces of even-row unit data (which are expressed as $M\_2i_0$-$M\_2i_{31}$, respectively). Similarly, low 256 bits of odd-numbered rows of the data M may be split in units of 8 bits to obtain 32 pieces of odd-row unit data (which are expressed as $M\_(2i+1)_0$-$M\_(2i+1)_{31}$, respectively). Further, the 32 pieces of even-row unit data after splitting and the 32 pieces of odd-row unit data after splitting may be placed alternatively in ascending order and in an order of even-numbered rows first and odd-numbered rows later of data bits. Specifically, a piece of even-row unit data 0 ($M\_2i_0$) may be placed in low bits, and then a piece of odd-row unit data 0 ($M(2i+1)_0$) may be placed sequentially. Next, a piece of even-row unit data 1 ($M\_2i_1$) may be placed . . . In a similar fashion, when the placement of a piece of odd-row unit data 31 ($M(2i+1)_{31}$) is completed, 64 pieces of unit data may be concatenated together to form a piece of new data with a bit width of 512 bits.

According to different application scenarios, the data conversion circuit and the data concatenation circuit in the data processing unit may be used in combination, so as to more flexibly perform pre-processing of data. For example, according to different operations included in the master instruction, the data processing unit may only perform the data conversion without performing the data concatenation operation, the data processing unit may only perform the data concatenation operation without performing the data conversion, or the data processing unit may perform both the data conversion and the data concatenation operation. In some scenarios, when the master instruction does not include the pre-processing operation for the slave operation, the data processing unit may be configured to disable the data conversion circuit and the data concatenation circuit.

As described earlier, the master processing circuit of the present disclosure may include one or a plurality of groups of multi-stage pipeline operation circuits, such as two groups of multi-stage pipeline operation circuits 304 and 306 shown in FIG. 3. Each group of multi-stage pipeline operation circuits performs multi-stage pipeline operations from a first stage to an N stage, where each stage may include one or a plurality of operators, so as to perform the multi-stage pipeline operations according to the master instruction. In an embodiment, the master processing circuit of the present disclosure may be implemented as a single instruction multiple data (SIMD) unit, and each group of multi-stage pipeline operation circuits may be formed into one operation pipeline. Different numbers of different or identical functional units (which are operators of the present disclosure) may be set in the operation pipeline step by step according to operation requirements, such as various types of functional units including an addition unit (or an adder), a multiplication unit (or a multiplier), and a lookup table unit (or a searcher).

In some application scenarios, when the sequence requirements of the pipeline are met, different functional units in the pipeline may be used in combination, and one stage of the pipeline completes an operation represented by one operation code (op) in a micro-instruction. As such, the SIMD of the present disclosure may support different stages of pipeline operations. In other words, based on settings of the operators in the operation pipeline, the SIMD of the present disclosure may support combinations of different numbers of ops flexibly.

Assuming that there is a pipeline (which is expressed as "stage1") similar to a first group of multi-stage pipeline operation circuits 304 and a second group of multi-stage pipeline operation circuits 306, six functional units may be arranged from top to bottom in the pipeline to form a six-stage pipeline, which may be expressed as: stage1-1-adder 1 (a first-stage adder), stage1-2-adder 2 (a second-stage adder), stage1-3-multiplier 1 (a first-stage multiplier), stage1-4-multiplier 2 (a second-stage multiplier), stage1-5-adder 1 (the first-stage adder), stage1-6-adder 2 (the second-stage adder). It may be shown that the first-stage adder (which serves as a first stage of the pipeline) and the second-stage adder (which serves as a second stage of the pipeline) may be used in combination, so as to complete two stages of operations of the addition operation. Similarly, the first-stage multiplier and the second-stage multiplier may also perform two stages of operations. Of course, here, two stages of adders or multipliers are only exemplary rather than restrictive, and in some application scenarios, only one stage of adder or multiplier may be arranged in the multi-stage pipeline.

In some embodiments, two or more pipelines described above may be set, where each pipeline may include several identical or different operators, so as to implement identical or different functions. Further, different pipelines may include different operators, so that each pipeline may implement operations for implementing different functions. The operators or circuits for implementing the aforementioned functions may include but are not limited to a random number processing circuit, an addition and subtraction circuit, a subtraction circuit, a lookup table circuit, a parameter configuration circuit, a multiplier, a divider, a pooling unit, a comparator, an absolute value calculating circuit, a logical operator, a position index circuit, or a filter. Here, taking the pooling unit as an example, the pooling unit may be illustratively composed of the adder, the divider, the comparator and other operators, so as to perform a pooling operation in a neural network.

In some application scenarios, the multi-stage pipeline operation in the master processing circuit may support a unary operation (which means that there is only one piece of input data in the operation). Taking an operation at scale layer+relu layer in the neuron network as an example, it is assumed that a to-be-operated computing instruction is expressed as result=relu(a*ina+b), where ina is input data (which is, for example, a vector or a matrix), and both a and b are operation constants. For this computing instruction, a group of three-stage pipeline operation circuits including the multiplier, the adder, and a nonlinear operator of the present disclosure may be applied to perform the operation. Specifically, a multiplier of a first stage of the pipeline may be used to compute a multiplication product between the input data ina and a, so as to obtain a first-stage pipeline operation result. Next, an adder of a second stage of the pipeline may be used to perform an addition operation on the first-stage pipeline operation result (a*ina) and b to obtain a second-stage pipeline operation result. Finally, a relu activation function of a third stage of the pipeline may be used to perform an activation operation on the second-stage pipeline operation result (a*ina+b) to obtain a final operation result (result).

In some application scenarios, the multi-stage pipeline operation circuit in the master processing circuit may support a binary operation (such as a convolution computing instruction result=conv(ina, inb)) or a ternary operation (such as a convolution computing instruction result=conv (ina, inb, bias)), where input data ina, inb, and bias may be either vectors (such as integer data, fixed-point data, or floating-point data), or matrices. Here, taking the convolution computing instruction result=conv(ina, inb) as an example, a plurality of multipliers, at least one addition tree and at least one nonlinear operator included in the three-stage pipeline operation circuit structure may be used to perform a convolution operation expressed by the computing instruction, where two pieces of input data ina and inb may be, for example, neuron data. Specifically, a first-stage pipeline multiplier of the three-stage pipeline operation circuit may be used first to obtain a first-stage pipeline operation result product=ina*inb (which may be regarded as one micro-instruction in the operation instructions and correspond to a multiplication operation). Next, an addition tree of a second-stage pipeline operation circuit may be used to perform a summation operation on the first-stage pipeline operation result "product" to obtain a second-stage pipeline operation result (sum). Finally, a nonlinear operator of a third-stage pipeline operation circuit may be used to perform an activation operation on "sum" to obtain a final convolution operation result.

In some application scenarios, a bypass operation may be performed on to-be-unused one or more stages of pipeline operation circuits in the operation. In other words, one or more stages of the multi-stage pipeline operation circuits may be selectively used according to requirements of the operation, and it is not required to go through all of the multi-stage pipeline operations. Taking a computing operation for Euclidean distance as an example, assuming that the computing instruction of the operation is expressed as dis=sum((ina-inb)^2), only several stages of pipeline operation circuits consisting of the adder, the multiplier, the addition tree and an accumulator may be used to perform the operation to obtain a final operation result, while an unused pipeline operation circuit may be bypassed before the pipeline operation or during the pipeline operation.

In the aforementioned pipeline operation, each group of pipeline operation circuits may perform the pipeline operation independently. However, each group of pipeline operation circuits in a plurality of groups of pipeline operation circuits may perform the pipeline operation collaboratively. For example, an output after a serial pipeline operation performed by a first stage and a second stage in a first group of pipeline operation circuits may serve as an input of a third stage pipeline operation of another group of pipeline operation circuits. For another example, the first stage and the second stage in the first group of pipeline operation circuits may perform parallel pipeline operations and output respective results of the pipeline operations, respectively. The results are used as inputs of a first stage and/or a second stage pipeline operation of another group of pipeline operation circuits.

Figure 4A:
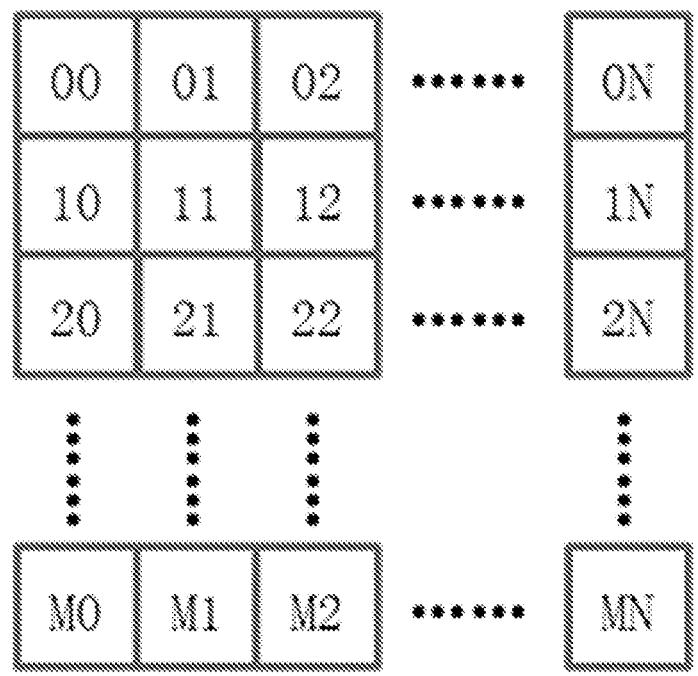
FIGS. 4A, 4B, and 4C show schematic diagrams of matrix conversions performed by a data conversion circuit according to embodiments of the present disclosure.
Figure 4B:
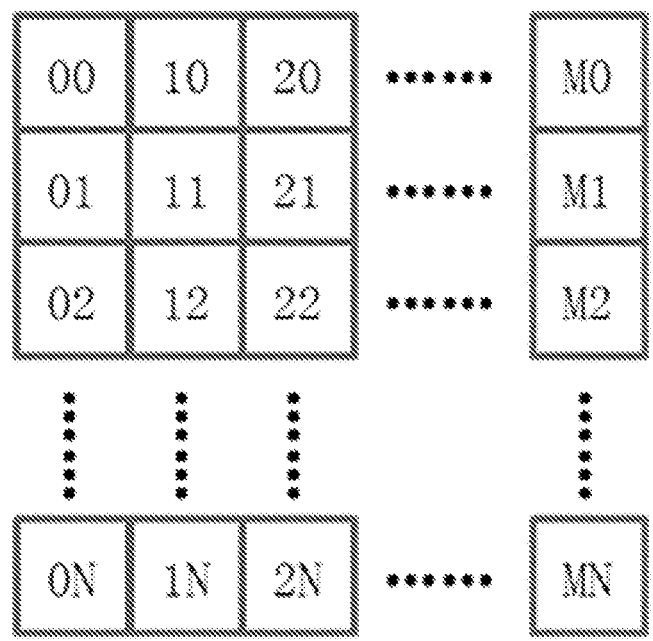
Figure 4C:
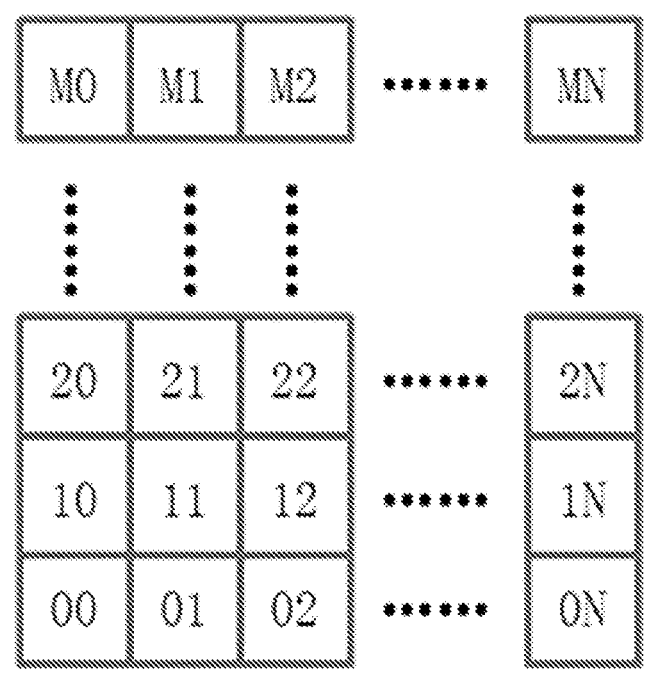

FIGS. 4A, 4B, and 4C show schematic diagrams of matrix conversions performed by a data conversion circuit according to embodiments of the present disclosure. In order to better understand conversion operations performed by the data conversion circuit 3021 in the master processing circuit, the following will further describe by taking a transposing operation and a horizontal mirroring operation performed by an original matrix as examples.

As shown in FIG. 4A, the original matrix is a matrix of (M+1) rows×(N+1) columns. According to requirements of an application scenario, the data conversion circuit may convert the original matrix shown in FIG. 4A through the transposing operation, so as to obtain a matrix shown in FIG. 4B. Specifically, the data conversion circuit may perform an exchange operation on row sequence numbers and column sequence numbers of elements in the original matrix to form a transposed matrix. Specifically, an element "10" located in row 1 and column 0 of the original matrix shown in FIG. 4A is located in row 0 and column 1 of the transposed matrix shown in FIG. 4B. In a similar fashion, an element "M0" located in row M+1 and column 0 of the original matrix shown in FIG. 4A is located in row 0 and column M+1 of the transposed matrix shown in FIG. 4B.

As shown in FIG. 4C, the data conversion circuit may perform the horizontal mirroring operation on the original matrix shown in FIG. 4A to form a horizontally-mirrored matrix. Specifically, through the horizontal mirroring operation, the data conversion circuit may convert a sequence from an element in a first row to an element in a last row in the original matrix into a sequence from the element in the last row to the element in the first row, and keep column sequence numbers of elements in the original matrix unchanged. Specifically, an element "00" located in row 0 and column 0 of the original matrix shown in FIG. 4A is located in row M+1 and column 0 of the horizontally-mirrored matrix shown in FIG. 4C, and an element "10" located in row 1 and column 0 of the original matrix shown in FIG. 4A is located in row M and column 0 of the horizontally-mirrored matrix shown in FIG. 4C. In a similar fashion, an element "M0" located in row M+1 and column 0 of the original matrix shown in FIG. 4A is located in row 0 and column 0 of the horizontally-mirrored matrix shown in FIG. 4C.

Figure 5:
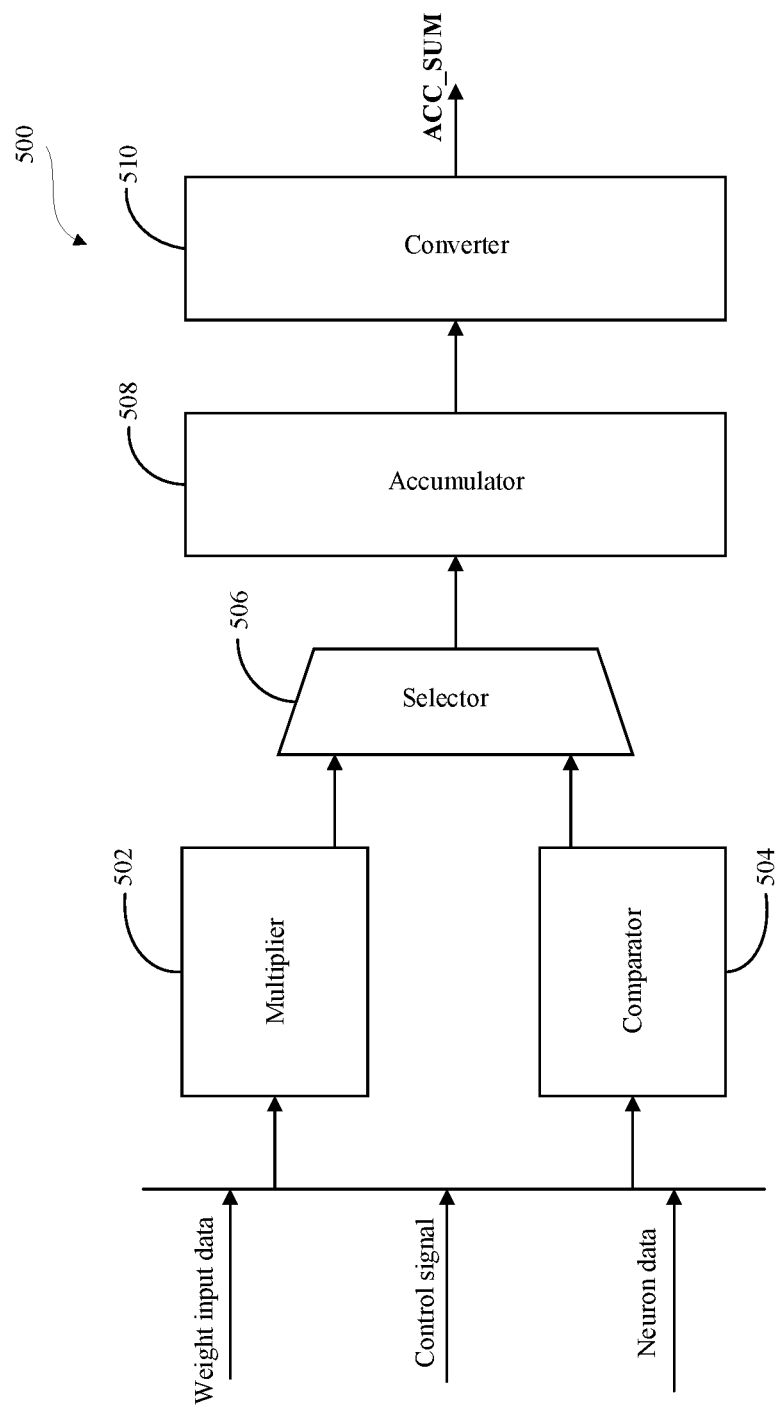
FIG. 5 is a block diagram of a slave processing circuit of a computing apparatus according to an embodiment of the present disclosure.

FIG. 5 is a block diagram of a slave processing circuit 500 of a computing apparatus according to an embodiment of the present disclosure. It may be understood that a structure shown in the figure is only exemplary rather than restrictive, and under the teaching of the present disclosure, those skilled in the art may think of adding more operators to form more stages of pipeline operation circuits.

As shown in FIG. 5, the slave processing circuit 500 includes four stages of pipeline operation circuits consisting of a multiplier 502, a comparator 504, a selector 506, an accumulator 508, and a converter 510. In an application scenario, the slave processing circuit may entirely perform a vector (including, for example, a matrix) operation.

When performing the vector operation, the slave processing circuit 500 may control vector data including weight data and neuron data to be input into the multiplier according to the received micro-instruction (such as a control signal shown in the figure). After the multiplication operation, the multiplier may input a result to the selector 506. Here, the selector 506 may choose to send a result from the multiplier rather than a result from the comparator to the accumulator 508 to perform an accumulation operation in the vector operation. Next, the accumulator may send a result after the accumulation to the converter 510 to perform the data conversion operation described above. Finally, the converter may use an accumulated sum (which is expressed as "ACC_SUM" in the figure) as a final result for outputting.

In addition to performing a matrix multiply accumulate ("MAC") operation between the aforementioned neuron data and the aforementioned weight data, the four stages of pipeline operation circuits shown in FIG. 5 may be further used to perform a histogram operation, a depthwise-layer multiply accumulate operation, an integral sum Winograd multiply accumulate operation and other operations in a neural network operation. When performing the histogram operation, in a first-stage operation, the slave processing circuit may send input data to the comparator according to the micro-instruction. Accordingly, here, the selector 506 may select the result from the comparator rather than the result from the multiplier to be sent to the accumulator to perform a subsequent operation.

Through the aforementioned description, those skilled in the art may understand that, in terms of hardware arrangements, the slave processing circuit of the present disclosure may include a plurality of operation circuits used for performing the slave operation, and the plurality of operation circuits may be connected and configured to perform operations of multi-stage pipelines. In one or a plurality of embodiments, the aforementioned operation circuits may include but are not limited to one or more of a multiplication circuit, a comparison circuit, an accumulation circuit, and a data conversion circuit, so as to at least perform the vector operation, such as a multi-dimensional convolution operation in the neural network.

In an operation scenario, the slave processing circuit of the present disclosure may perform an operation on data after the pre-processing operation performed by the master processing circuit according to the slave instruction (which is implemented as, for example, one or a plurality of micro-instructions or control signals), so as to obtain an expected operation result. In another operation scenario, the slave processing circuit may send (for example, via an interconnection interface) an intermediate result obtained after the operation to the data processing unit in the master processing circuit, so that the data conversion circuit in the data processing unit may perform data type conversions on the intermediate result, or the data concatenation circuit in the data processing unit may perform data splitting and concatenation operations on the intermediate result, so as to obtain a final operation result. The following will describe operations of the master processing circuit and the slave processing circuit of the present disclosure in combination with some exemplary instructions.

Taking a computing instruction "COSHLC" including the pre-processing operation as an example, the operation (including the pre-processing operation performed by the master processing circuit and the slave operation performed by the slave processing circuit) performed by the computing instruction may be expressed as:

COSHLC=FPTOFIX+SHUFFLE+$LT$3DCONV.

In this expression, FPTOFIX represents a data type conversion operation performed by the data conversion circuit in the master processing circuit, which is to convert input data from a floating-point number to a fixed-point number; SHUFFLE represents a data concatenation operation performed by the data concatenation circuit; and LT3DCONV represents a 3DCONV operation, which is a convolution operation on three-dimensional data, performed by the slave processing circuit (which is denoted as "LT"). It may be understood that, when only the convolution operation on the three-dimensional data is performed, both FPTOFIX and SHUFFLE acting as parts of the master operation may be set as optional operations.

Taking a computing instruction "LCSU" including the post-processing operation as an example, the operation (including the slave operation performed by the slave processing circuit and the post-processing operation performed by the master processing circuit) performed by the computing instruction may be expressed as:

LCSU=$LT$3DCONV+SUB.

In this expression, after the slave processing circuit performs the LT3DCONV operation to obtain a 3D convolution result, a subtractor in the master processing circuit may perform a subtraction operation SUB on the 3D convolution result. As such, during an execution period of each instruction, one binary operand (which includes the convolution result and a subtrahend) may be input, and one unary operand (which includes a final result obtained after performing the LCSU instruction) may be output.

Taking a computing instruction "SHLCAD" including the pre-processing operation, the slave operation, and the post-processing operation as an example, the operation (including the pre-processing operation performed by the master processing circuit, the slave operation performed by the slave processing circuit, and the post-processing operation performed by the master processing circuit) performed by the computing instruction may be expressed as:

SHLCAD=SHUFFLE+$LT$3DCONV+ADD.

In this expression, in the pre-processing operation, the data concatenation circuit performs the data concatenation operation represented by SHUFFLE. Next, the slave processing circuit performs the LT3DCONV operation on data after concatenation to obtain the 3D convolution result. Finally, an adder in the master processing circuit performs an addition operation ADD on the 3D convolution result to obtain a final computing result.

From the examples above, those skilled in the art may understand that, after the computing instruction is parsed, the obtained operation instructions of the present disclosure may include one of the following combinations according to specific operations: the pre-processing instruction and a slave processing instruction; the slave processing instruction and the post-processing instruction; and the pre-processing instruction, the slave processing instruction and the post-processing instruction. Based on this, in some embodiments, the pre-processing instruction may include a data conversion instruction and/or a data concatenation instruction. In some other embodiments, the post-processing instruction may include one of more of the followings: a random number processing instruction, an addition instruction, a subtraction instruction, a lookup table instruction, a parameter configuration instruction, a multiplication instruction, a pooling instruction, an activation instruction, a comparison instruction, an absolute value calculating instruction, a logical operation instruction, a position index instruction, or a filtering instruction. In some other embodiments, the slave processing instruction may include various types of operation instructions, which include but are not limited to instructions similar to those in the post-processing instruction and instructions for complex data processing, such as vector operation instructions.

Based on the aforementioned description in combination with FIGS. 1-5, those skilled in the art may understand that the present disclosure actually discloses a method of using the aforementioned computing apparatus to perform a computing operation. In different implementation scenarios, the computing apparatus may include, for example, the master processing circuit and at least one slave processing circuit. Based on this, the method may include: configuring the master processing circuit to respond to the master instruction to perform the master operation, and configuring the slave processing circuit to respond to the slave instruction to perform the slave operation, where the master operation includes the pre-processing operation and/or the post-processing operation for the slave operation, and the master instruction and the slave instruction are obtained by parsing the computing instruction received by the computing apparatus.

In an embodiment, the aforementioned method may configure the master processing circuit to acquire the computing instruction and parse the computing instruction to obtain the master instruction and the slave instruction, and send the slave instruction to the slave processing circuit. In another embodiment, when the aforementioned computing apparatus includes the aforementioned control circuit, the method further includes configuring the control circuit to: acquire the computing instruction and parse the computing instruction to obtain the master instruction and the slave instruction; and send the master instruction to the master processing circuit and send the slave instruction to the slave processing circuit. For the sake of brevity, here does not further describe executable steps of the method of the present disclosure, and those skilled in the art may understand that the method of the present disclosure may include performing various types of operation steps described above in combination with FIGS. 1-5.

Figure 6:
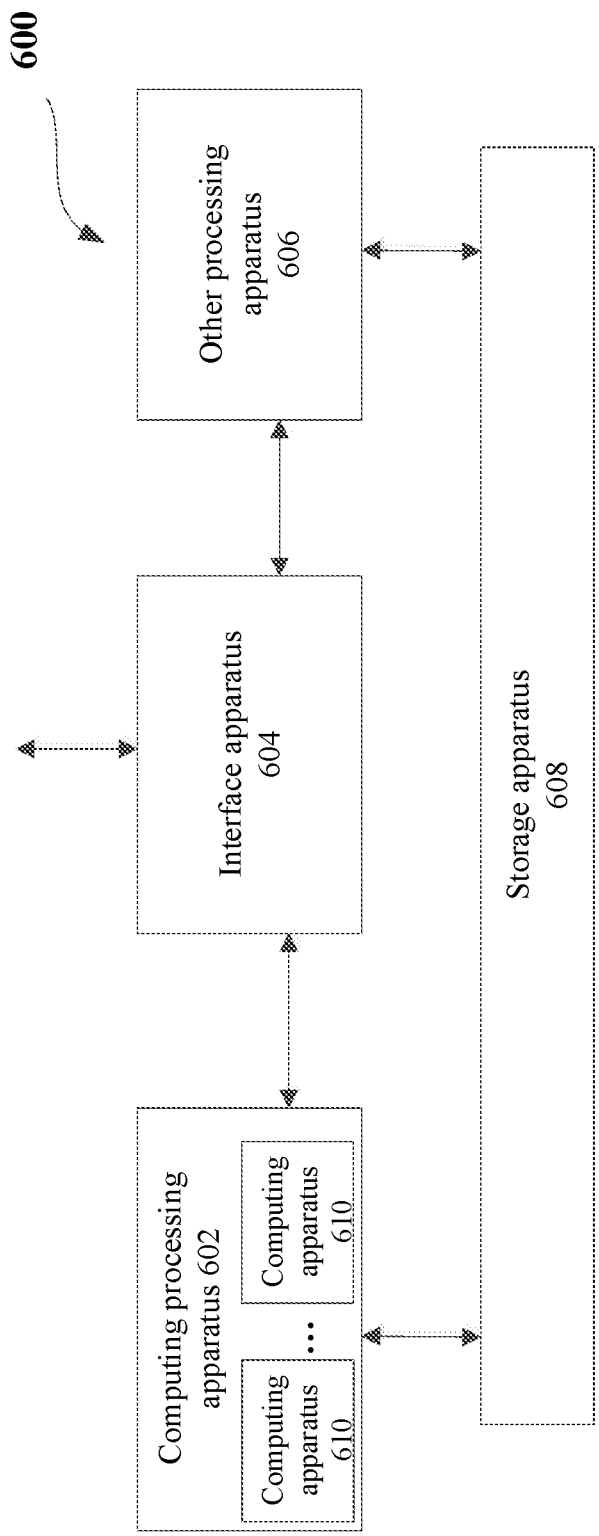
FIG. 6 is a structural diagram of a combined processing apparatus according to an embodiment of the present disclosure.

FIG. 6 is a structural diagram of a combined processing apparatus 600 according to an embodiment of the present disclosure. As shown in FIG. 6, the combined processing apparatus 600 may include a computing processing apparatus 602, an interface apparatus 604, other processing apparatus 606, and a storage apparatus 608. According to different application scenarios, the computing processing apparatus may include one or a plurality of computing apparatuses 610, and the computing apparatus may be configured to perform operations described above in combination with FIGS. 1-5.

In different embodiments, the computing processing apparatus of the present disclosure may be configured to perform an operation specified by a user. In an exemplary application, the computing processing apparatus may be implemented as a single-core artificial intelligence processor or a multi-core artificial intelligence processor. Similarly, one or a plurality of computing apparatuses included in the computing processing apparatus may be implemented as an artificial intelligence processor core or a partial hardware structure of the artificial intelligence processor core. If the plurality of computing apparatuses are implemented as artificial intelligence processor cores or partial hardware structures of the artificial intelligence processor cores, the computing processing apparatus of the present disclosure may be regarded as having a single-core structure or an isomorphic multi-core structure.

In an exemplary operation, the computing processing apparatus of the present disclosure interacts with other processing apparatus through the interface apparatus, so as to jointly complete the operation specified by the user. According to different implementations, other processing apparatus of the present disclosure may include one or more kinds of general and/or dedicated processors, including a central processing unit (CPU), a graphics processing unit (GPU), an artificial intelligence processor, and the like. These processors may include but are not limited to a digital signal processor (DSP), an application specific integrated circuit (ASIC), a field-programmable gate array (FPGA), or other programmable logic devices, discrete gate or transistor logic devices, discrete hardware components, and the like. The number of the processors may be determined according to actual requirements. As described above, with respect to the computing processing apparatus of the present disclosure only, the computing processing apparatus of the present disclosure may be regarded as having the single-core structure or the isomorphic multi-core structure. However, when considered together, both the computing processing apparatus and other processing apparatus may be regarded as forming a heterogeneous multi-core structure.

In one or a plurality of embodiments, other processing apparatus may serve as an interface between the computing processing apparatus (which may be embodied as an artificial intelligence computing apparatus such as a computing apparatus for a neural network operation) of the present disclosure and external data and controls. Other processing apparatus may perform basic controls that include but are not limited to data moving, and starting and/or stopping the computing apparatus. In another embodiment, other processing apparatus may also cooperate with the computing processing apparatus to jointly complete an operation task.

In one or a plurality of embodiments, the interface apparatus may be used to transfer data and a control instruction between the computing processing apparatus and other processing apparatus. For example, the computing processing apparatus may obtain input data from other processing apparatus via the interface apparatus and write the input data to an on-chip storage apparatus (or called a memory) of the computing processing apparatus. Further, the computing processing apparatus may obtain the control instruction from other processing apparatus via the interface apparatus and write the control instruction to an on-chip control caching unit of the computing processing apparatus. Alternatively or optionally, the interface apparatus may further read data in the storage apparatus of the computing processing apparatus and then transfer the data to other processing apparatus.

Additionally or optionally, the combined processing apparatus of the present disclosure may further include a storage apparatus. As shown in the figure, the storage apparatus may be connected to the computing processing apparatus and other processing apparatus, respectively. In one or a plurality of embodiments, the storage apparatus may be used to store data of the computing processing apparatus and/or other processing apparatus. For example, the data may be data that may not be fully stored in the internal or the on-chip storage apparatus of the computing processing apparatus or other processing apparatus.

Figure 7:
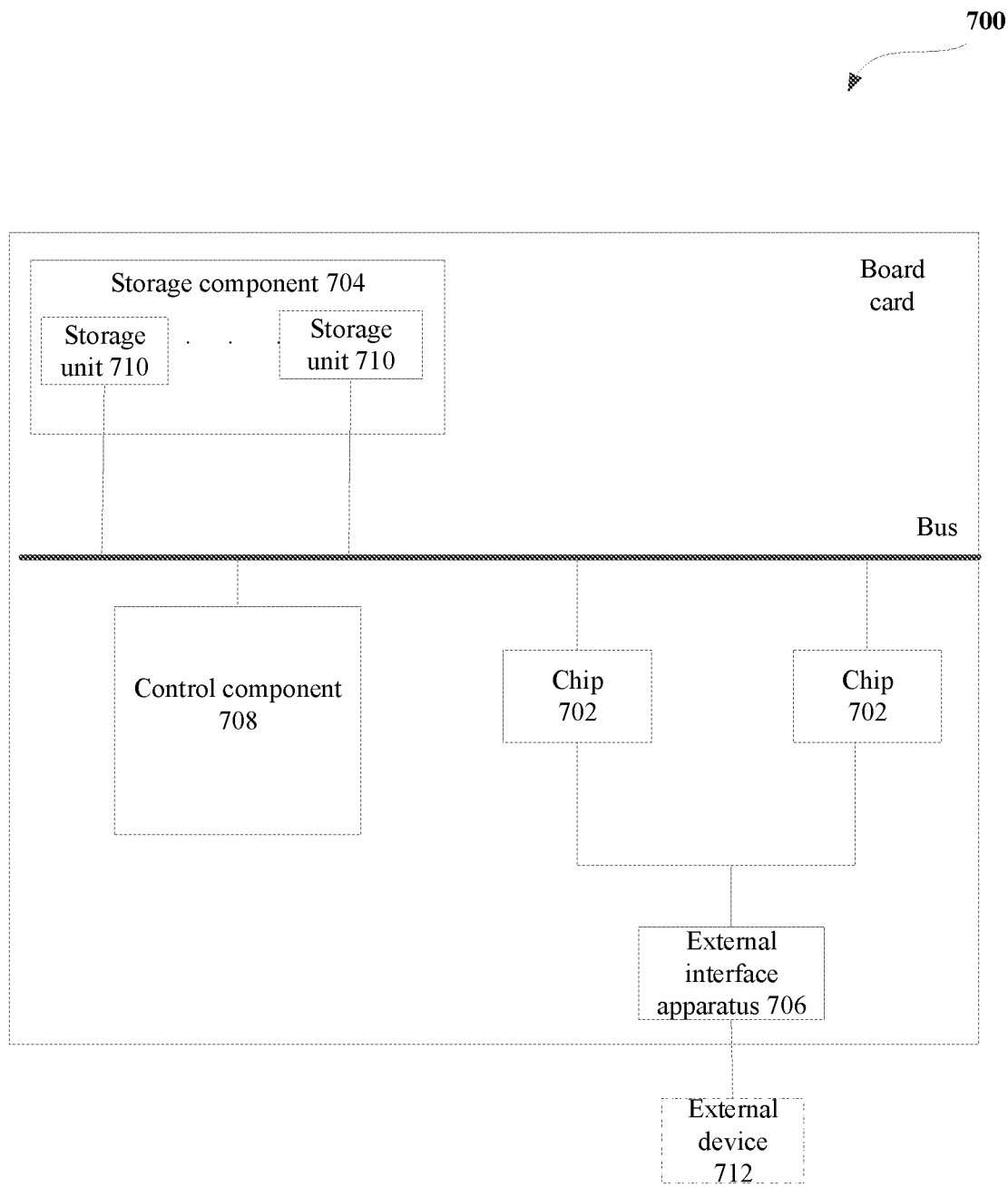
FIG. 7 is a schematic structural diagram of a board card according to an embodiment of the present disclosure.

In some embodiments, the present disclosure also discloses a chip (such as a chip 702 shown in FIG. 7). In an implementation, the chip may be a system on chip (SoC) and may integrate one or a plurality of combined processing apparatuses shown in FIG. 6. The chip may be connected to other related components through an external interface apparatus (such as an external interface apparatus 706 shown in FIG. 7). The related components may be, for example, a camera, a monitor, a mouse, a keyboard, a network card, or a WIFI interface. In some application scenarios, the chip may integrate other processing units (such as a video codec) and/or interface units (such as a dynamic random access memory (DRAM) interface), and the like. In some embodiments, the present disclosure also discloses a chip package structure, including the chip above. In some embodiments, the present disclosure also discloses a board card, including the chip package structure above. The following will describe the board card in detail in combination with FIG. 7.

FIG. 7 is a schematic structural diagram of a board card 700 according to an embodiment of the present disclosure. As shown in FIG. 7, the board card may include a storage component 704 used for storing data, which may include one or a plurality of storage units 710. The storage component may connect to and transfer data with a control component 708 and the aforementioned chip 702 through a bus. Further, the board card may include an external interface apparatus 706, which may be configured to implement data relay or transfer between the chip (or the chip in the chip package structure) and an external device 712 (such as a server or a computer, and the like). For example, to-be-processed data may be transferred from the external device to the chip through the external interface apparatus. For another example, a computing result of the chip may be still sent back to the external device through the external interface apparatus. According to different application scenarios, the external interface apparatus may have different interface forms. For example, the external interface apparatus may adopt a standard peripheral component interconnect express (PCIe) interface.

In one or a plurality of embodiments, the control component in the board card of the present disclosure may be configured to regulate and control a state of the chip. As such, in an application scenario, the control component may include a micro controller unit (MCU), which may be used to regulate and control a working state of the chip.

According to the aforementioned descriptions in combination with FIG. 6 and FIG. 7, those skilled in the art may understand that the present disclosure also discloses an electronic device or apparatus, which may include one or a plurality of the aforementioned board cards, one or a plurality of the aforementioned chips, and/or one or a plurality of the aforementioned combined processing apparatuses.

According to different application scenarios, the electronic device or apparatus of the present disclosure may include a server, a cloud server, a server cluster, a data processing apparatus, a robot, a computer, a printer, a scanner, a tablet, a smart terminal, a PC device, an Internet of Things terminal, a mobile terminal, a mobile phone, a traffic recorder, a navigator, a sensor, a webcam, a camera, a video camera, a projector, a watch, a headphone, a mobile storage, a wearable device, a visual terminal, an autonomous driving terminal, a vehicle, a household appliance, and/or a medical device. The vehicle includes an airplane, a ship, and/or a car; the household appliance includes a television, an air conditioner, a microwave oven, a refrigerator, an electric rice cooker, a humidifier, a washing machine, an electric lamp, a gas cooker, and a range hood; and the medical device includes a nuclear magnetic resonance spectrometer, a B-ultrasonic scanner, and/or an electrocardiograph. The electronic device or apparatus of the present disclosure may be further applied to Internet, Internet of Things, data center, energy, transportation, public management, manufacturing, education, power grid, telecommunications, finance, retail, construction sites, medical, and other fields. Further, the electronic device or apparatus of the present disclosure may be used in application scenarios including cloud, edge, and terminal related to artificial intelligence, big data, and/or cloud computing. In one or a plurality of embodiments, according to the solution of the present disclosure, an electronic device or apparatus with high computing power may be applied to a cloud device (such as the cloud server), while an electronic device or apparatus with low power consumption may be applied to a terminal device and/or an edge device (such as a smart phone or the webcam). In one or a plurality of embodiments, hardware information of the cloud device is compatible with that of the terminal device and/or the edge device. As such, according to the hardware information of the terminal device and/or the edge device, appropriate hardware resources may be matched from hardware resources of the cloud device to simulate hardware resources of the terminal device and/or the edge device, so as to complete unified management, scheduling, and collaborative work of terminal-cloud integration or cloud-edge-terminal integration.

It is required to be explained that for the sake of brevity, the present disclosure describes some method embodiments as a series of actions and combinations thereof, but those skilled in the art may understand that the solution of the present disclosure is not limited by an order of actions described. Therefore, according to the present disclosure or under the teaching of the present disclosure, those skilled in the art may understand that some steps of the method embodiments may be executed in other orders or simultaneously. Further, those skilled in the art may understand that the embodiments described in the present disclosure may be regarded as optional embodiments; in other words, actions and modules involved thereof are not necessarily required for the implementation of a certain solution or some solutions of the present disclosure. Additionally, according to different solutions, descriptions of some embodiments of the present disclosure have their own emphases. In view of this, those skilled in the art may understand that for parts that are not described in detail in a certain embodiment of the present disclosure, reference may be made to related descriptions in other embodiments.

For specific implementations, according to the present disclosure and under the teaching of the present disclosure, those skilled in the art may understand that several embodiments disclosed in the present disclosure may be implemented through other methods that are not disclosed in the present disclosure. For example, for units in the electronic device or apparatus embodiment mentioned above, the present disclosure divides the units on the basis of considering logical functions, but there may be other division methods during actual implementations. For another example, a plurality of units or components may be combined or integrated into another system, or some features or functions in the units or components may be selectively disabled. In terms of a connection between different units or components, the connection discussed above in combination with drawings may be direct or indirect coupling between the units or components. In some scenarios, the aforementioned direct or indirect coupling relates to a communication connection using an interface, where the communication interface may support electrical, optical, acoustic, magnetic, or other forms of signal transmission.

In the present disclosure, units described as separate components may or may not be physically separated. Components shown as units may or may not be physical units. The aforementioned components or units may be located in the same position or distributed to a plurality of network units. Additionally, according to actual requirements, some or all of the units may be selected to achieve purposes of the solution described in embodiments of the present disclosure. Additionally, in some scenarios, the plurality of units in the embodiments of the present disclosure may be integrated into one unit, or each of the units may be physically separated.

In some implementation scenarios, the aforementioned integrated unit may be implemented in the form of a software program module. If the integrated unit is implemented in the form of the software program module and sold or used as an independent product, the integrated unit may be stored in a computer-readable memory. Based on such understanding, if the solution of the present disclosure is embodied in the form of a software product (such as a computer-readable storage medium), the software product may be stored in a memory, and the software product may include several instructions used to enable a computer device (such as a personal computer, a server, or a network device, and the like) to perform part or all of steps of the method of the embodiments of the present disclosure. The foregoing memory may include but is not limited to an USB, a flash disk, a read only memory (ROM), a random access memory (RAM), a mobile hard disk, a magnetic disk, or an optical disc, and other media that may store a program code.

In some other implementation scenarios, the aforementioned integrated unit may be implemented in the form of hardware. The hardware may be a specific hardware circuit, which may include a digital circuit and/or an analog circuit. A physical implementation of a hardware structure of the circuit may include but is not limited to a physical component, and the physical component may include but is not limited to a transistor, or a memristor, and the like. In view of this, various apparatuses described in the present disclosure (such as the computing apparatus or other processing apparatus) may be implemented by an appropriate hardware processor, such as a central processing unit (CPU), a graphics processing unit (GPU), a field-programmable gate array (FPGA), a digital signal processor (DSP), and an application-specific integrated circuit (ASIC). Further, the aforementioned storage unit or storage apparatus may be any appropriate storage medium (including a magnetic storage medium or a magneto-optical storage medium, and the like), such as a resistive random access memory (RRAM), a dynamic random access memory (DRAM), a static random access memory (SRAM), an enhanced dynamic random access memory (EDRAM), a high bandwidth memory (HBM), a hybrid memory cube (HMC), the ROM, and the RAM, and the like.

The foregoing may be better understood according to following articles:

Article 1. A computing apparatus, including a master processing circuit and at least one slave processing circuit, where the master processing circuit is configured to respond to a master instruction to perform a master operation, and the slave processing circuit is configured to respond to a slave instruction to perform a slave operation, where the master operation includes a pre-processing operation and/or a post-processing operation for the slave operation, and the master instruction and the slave instruction are obtained by parsing a computing instruction received by the computing apparatus.

Article 2. The computing apparatus of article 1, where the master processing circuit is configured to: acquire the computing instruction and parse the computing instruction to obtain the master instruction and the slave instruction; and send the slave instruction to the slave processing circuit.

Article 3. The computing apparatus of article 1, further including a control circuit configured to: acquire the computing instruction and parse the computing instruction to obtain the master instruction and the slave instruction; and send the master instruction to the master processing circuit and send the slave instruction to the slave processing circuit.

Article 4. The computing apparatus of article 1, where the master instruction includes an identification bit used for identifying the pre-processing operation and/or the post-processing operation.

Article 5. The computing apparatus of article 1, where the computing instruction includes a preset bit used for distinguishing the pre-processing operation and the post-processing operation in the master instruction.

Article 6. The computing apparatus of article 1, where the master processing circuit includes a data processing unit used for performing the master operation, and the data processing unit includes a data conversion circuit used for performing a data conversion operation and/or a data concatenation circuit used for performing a data concatenation operation.

Article 7. The computing apparatus of article 6, where the data conversion circuit includes one or a plurality of converters used for implementing conversions of computing data among a plurality of different data types.

Article 8. The computing apparatus of article 6, where the data concatenation circuit is configured to split the computing data according to a predetermined bit length and concatenate a plurality of data blocks obtained after splitting according to a predetermined sequence.

Article 9. The computing apparatus of article 1, where the master processing circuit includes one or a plurality of groups of pipeline operation circuits, and each group of pipeline operation circuits is formed into one operation pipeline and includes one or a plurality of operators, where, when each group of pipeline operation circuits includes a plurality of operators, the plurality of operators are connected and configured to selectively participate in performing the master operation according to the master instruction.

Article 10. The computing apparatus of article 9, where the master processing circuit includes at least two operation pipelines, and each operation pipeline includes one or a plurality of operators or circuits in the followings: a random number processing circuit, an addition and subtraction circuit, a subtraction circuit, a lookup table circuit, a parameter configuration circuit, a multiplier, a divider, a pooling unit, a comparator, an absolute value calculating circuit, a logical operator, a position index circuit, or a filter.

Article 11. The computing apparatus of article 1, where the slave processing circuit includes a plurality of operation circuits used for performing the slave operation, and the plurality of operation circuits are connected and configured to perform operations of multi-stage pipelines, where the operation circuits include one or more of a multiplication circuit, a comparison circuit, an accumulation circuit, and a data conversion circuit, so as to at least perform a vector operation.

Article 12. The computing apparatus of article 11, where the slave instruction includes a convolution instruction for performing a convolution operation on computing data after the pre-processing operation, and the slave processing circuit is configured to: perform the convolution operation on the computing data after the pre-processing operation according to the convolution instruction.

Article 13. An integrated circuit chip, including the computing apparatus of any one of articles 1-12.

Article 14. A board card, including the integrated circuit chip of article 13.

Article 15. An electronic device, including the integrated circuit chip of article 13.

Article 16. A method of using a computing apparatus to perform a computing operation, where the computing apparatus includes a master processing circuit and at least one slave processing circuit, and the method includes: configuring the master processing circuit to respond to a master instruction to perform a master operation and configuring the slave processing circuit to respond to a slave instruction to perform a slave operation, where the master operation includes a pre-processing operation and/or a post-processing operation for the slave operation, and the master instruction and the slave instruction are obtained by parsing a computing instruction received by the computing apparatus.

Article 17. The method of article 16, where the master processing circuit is configured to: acquire the computing instruction and parse the computing instruction to obtain the master instruction and the slave instruction; and send the slave instruction to the slave processing circuit.

Article 18. The method of article 16, where the computing apparatus includes a control circuit, and the method further includes configuring the control circuit to: acquire the computing instruction and parse the computing instruction to obtain the master instruction and the slave instruction; and send the master instruction to the master processing circuit and send the slave instruction to the slave processing circuit.

Article 19. The method of article 16, where the master instruction includes an identification bit used for identifying the pre-processing operation and/or the post-processing operation.

Article 20. The method of article 16, where the computing instruction includes a preset bit used for distinguishing the pre-processing operation and the post-processing operation in the master instruction.

Article 21. The method of article 16, where the master processing circuit includes a data processing unit, which includes a data conversion circuit and/or a data concatenation circuit, and the method includes configuring the data processing unit to perform the master operation, configuring the data conversion circuit to perform a data conversion operation, and configuring the data concatenation circuit to perform a data concatenation operation.

Article 22. The method of article 21, where the data conversion circuit includes one or a plurality of converters, and the method includes configuring the one or the plurality of converters to implement conversions of computing data among a plurality of different data types.

Article 23. The method of article 21, where the data concatenation circuit is configured to split the computing data according to a predetermined bit length and concatenate a plurality of data blocks obtained after splitting according to a predetermined sequence.

Article 24. The method of article 16, where the master processing circuit includes one or a plurality of groups of pipeline operation circuits, and each group of pipeline operation circuits is formed into one operation pipeline and includes one or a plurality of operators, where, when each group of pipeline operation circuits includes a plurality of operators, the method includes connecting and configuring the plurality of operators to selectively participate in performing the master operation according to the master instruction.

Article 25. The method of article 24, where the master processing circuit includes at least two operation pipelines, and each operation pipeline includes one or a plurality of operators or circuits in the followings:

a random number processing circuit, an addition and subtraction circuit, a subtraction circuit, a lookup table circuit, a parameter configuration circuit, a multiplier, a divider, a pooling unit, a comparator, an absolute value calculating circuit, a logical operator, a position index circuit, or a filter.

Article 26. The method of article 16, where the slave processing circuit includes a plurality of operation circuits, the method includes configuring the plurality of operation circuits to perform the slave operation, and the method further includes connecting and configuring the plurality of operation circuits to perform operations of multi-stage pipelines, where the operation circuits include one or more of a multiplication circuit, a comparison circuit, an accumulation circuit, and a data conversion circuit, so as to at least perform a vector operation.

Article 27. The method of article 26, where the slave instruction includes a convolution instruction for performing a convolution operation on computing data after the pre-processing operation, and the method includes configuring the slave processing circuit to:

perform the convolution operation on the computing data after the pre-processing operation according to the convolution instruction.

Although a plurality of embodiments of the present disclosure have been shown and described, it is obvious to those skilled in the art that such embodiments are provided only as examples. Those skilled in the art may think of many modifying, altering, and substituting methods without deviating from the thought and spirit of the present disclosure. It should be understood that alternatives to the embodiments of the present disclosure described herein may be employed in the practice of the present disclosure. The attached claims are intended to limit the scope of protection of the present disclosure and therefore to cover equivalents or alternatives within the scope of these claims.

What is claimed is:

1. A computing apparatus comprising:
a master processing circuit configured to respond to a master instruction to perform a master operation; and
at least one slave processing circuit is configured to respond to a slave instruction to perform a slave operation,
wherein the master operation comprises a pre-processing operation and/or a post-processing operation for the slave operation, and the master instruction and the slave instruction are obtained by parsing a computing instruction received by the computing apparatus, wherein the master processing circuit comprises one or a plurality of groups of pipeline operation circuits, and each group of pipeline operation circuits is formed into one operation pipeline and comprises one or a plurality of operators, wherein, when each group of pipeline operation circuits comprises a plurality of operators. the plurality of operators are connected and configured to selectively participate in performing the master operation according to the master instruction.

2. The computing apparatus of claim 1, wherein the master processing circuit is configured to:
acquire the computing instruction and parse the computing instruction to obtain the master instruction and the slave instruction; and
send the slave instruction to the slave processing circuit.

3. The computing apparatus of claim 1, further comprising a control circuit configured to:
acquire the computing instruction and parse the computing instruction to obtain the master instruction and the slave instruction; and
send the master instruction to the master processing circuit and send the slave instruction to the slave processing circuit.

4. The computing apparatus of claim 1, wherein the master instruction comprises an identification bit used for identifying the pre-processing operation and/or the post-processing operation.

5. The computing apparatus of claim 1, wherein the computing instruction comprises a preset bit used for distinguishing the pre-processing operation and the post-processing operation in the master instruction.

6. The computing apparatus of claim 1, wherein the master processing circuit comprises a data processing unit used for performing the master operation, and the data processing unit comprises a data conversion circuit used for performing a data conversion operation and/or a data concatenation circuit used for performing a data concatenation operation.

7. The computing apparatus of claim 6, wherein the data conversion circuit comprises one or a plurality of converters used for implementing conversions of computing data among a plurality of different data types.

8. The computing apparatus of claim 6, wherein the data concatenation circuit is configured to split the computing data according to a predetermined bit length and concatenate a plurality of data blocks obtained after splitting according to a predetermined sequence.

9. The computing apparatus of claim 1, wherein the master processing circuit comprises at least two operation pipelines, and each operation pipeline comprises one or a plurality of operators or circuits in the followings:
a random number processing circuit, an addition and subtraction circuit, a subtraction circuit, a lookup table circuit, a parameter configuration circuit, a multiplier, a divider, a pooling unit, a comparator, an absolute value calculating circuit, a logical operator, a position index circuit, or a filter.

10. The computing apparatus of claim 1, wherein the slave processing circuit comprises a plurality of operation circuits used for performing the slave operation, and the plurality of operation circuits are connected and configured to perform operations of multi-stage pipelines, wherein the operation circuits comprise one or more of a multiplication circuit, a comparison circuit, an accumulation circuit, and a data conversion circuit, so as to at least perform a vector operation.

11. The computing apparatus of claim 10, wherein the slave instruction comprises a convolution instruction for performing a convolution operation on computing data after the pre-processing operation, and the slave processing circuit is configured to:

perform the convolution operation on the computing data after the pre-processing operation according to the convolution instruction.

12. An integrated circuit chip, comprising the computing apparatus of claim 1.

13. A method of using a computing apparatus to perform a computing operation, wherein the computing apparatus comprises a master processing circuit and at least one slave processing circuit, the method comprising:

configuring the master processing circuit to respond to a master instruction to perform a master operation; and configuring the slave processing circuit to respond to a slave instruction to perform a slave operation, wherein the master operation comprises a pre-processing operation and/or a post- processing operation for the slave operation, and the master instruction and the slave instruction are obtained by parsing a computing instruction received by the computing apparatus, wherein the master processing circuit comprises one or a plurality of groups of pipeline operation circuits, and each group of pipeline operation circuits is formed into one operation pipeline and comprises one or a plurality of operators, wherein, when each group of pipeline operation circuits comprises a plurality of operators, the plurality of operators are connected and configured to selectively participate in performing the master operation according to the master instruction.

14. The method of claim 13, wherein the master processing circuit is configured to:

acquire the computing instruction and parse the computing instruction to obtain the master instruction and the slave instruction; and send the slave instruction to the slave processing circuit.

15. The method of claim 13, wherein the computing apparatus comprises a control circuit, and the method further comprises configuring the control circuit to:

acquire the computing instruction and parse the computing instruction to obtain the master instruction and the slave instruction; and send the master instruction to the master processing circuit and send the slave instruction to the slave processing circuit.

16. The method of claim 13, wherein the master instruction comprises an identification bit used for identifying the pre-processing operation and/or the post-processing operation.

17. The method of claim 13, wherein the computing instruction comprises a preset bit used for distinguishing the pre-processing operation and the post-processing operation in the master instruction.

18. The method of claim 13, wherein the master processing circuit comprises a data processing unit, which comprises a data conversion circuit and/or a data concatenation circuit, and the method comprises configuring the data processing unit to perform the master operation, configuring the data conversion circuit to perform a data conversion operation, and configuring the data concatenation circuit to perform a data concatenation operation.

19. The method of claim 18, wherein the data conversion circuit comprises one or a plurality of converters, and the method comprises configuring the one or the plurality of converters to implement conversions of computing data among a plurality of different data types.

* * * * *